US012107901B2

(12) United States Patent
Koyama et al.

(10) Patent No.: US 12,107,901 B2
(45) Date of Patent: Oct. 1, 2024

(54) DEVICE MANAGEMENT SYSTEM, DEVICE MANAGEMENT METHOD, AND RECORDING MEDIUM HAVING DEVICE MANAGEMENT PROGRAM RECORDED THEREON

(71) Applicant: SHARP KABUSHIKI KAISHA, Sakai (JP)

(72) Inventors: Noriyuki Koyama, Sakai (JP); Takahiro Ichitsuka, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 301 days.

(21) Appl. No.: 17/711,796

(22) Filed: Apr. 1, 2022

(65) Prior Publication Data

US 2022/0345499 A1   Oct. 27, 2022

(30) Foreign Application Priority Data

Apr. 26, 2021   (JP) .................................. 2021-074201

(51) Int. Cl.
*H04L 9/40*        (2022.01)
*H04L 67/10*       (2022.01)

(52) U.S. Cl.
CPC ............ *H04L 63/205* (2013.01); *H04L 67/10* (2013.01)

(58) Field of Classification Search
CPC .............. G06Q 30/0202; G06Q 40/04; G06Q 10/0637; G06Q 10/067; G06Q 30/0201; G06Q 30/0205; G06Q 40/06; G06Q 40/08; G06N 5/04; G06N 7/005; G06N 99/005; H04L 63/1425; H04L 63/1441; H04L 63/0861; H04L 43/04; H04L 63/205

USPC ............ 726/3, 2, 21, 36; 713/150, 163, 181; 380/255, 264, 276
See application file for complete search history.

(56) References Cited

U.S. PATENT DOCUMENTS

| | | | |
|---|---|---|---|
| 6,256,544 B1 * | 7/2001 | Weissinger | G05B 19/0421 700/1 |
| 7,171,515 B2 * | 1/2007 | Ohta | G06F 12/127 711/E12.076 |
| 7,530,105 B2 * | 5/2009 | Gilbert | H04L 63/1425 709/227 |
| 8,832,840 B2 * | 9/2014 | Zhu | G06F 21/577 726/25 |
| 9,256,735 B2 * | 2/2016 | Stute | H04L 63/1425 |

(Continued)

FOREIGN PATENT DOCUMENTS

JP        2002-223212 A      8/2002

*Primary Examiner* — Sharif E Ullah
(74) *Attorney, Agent, or Firm* — ScienBiziP, P.C.

(57) ABSTRACT

According to an embodiment, a device management system includes: an acquisition processing portion which acquires log information indicating each of connection histories of a plurality of management target devices to a network; an extraction processing portion which extracts, on the basis of the log information acquired by the acquisition processing portion, a specific first management target device from the plurality of management target devices; and a grouping processing portion which registers, on the basis of the log information acquired by the acquisition processing portion, and first identification information of the first management target device extracted by the extraction processing portion, each of the plurality of management target devices in one of a plurality of groups.

7 Claims, 10 Drawing Sheets

(56) References Cited

U.S. PATENT DOCUMENTS

| | | | |
|---|---|---|---|
| 9,560,065 B2* | 1/2017 | Neil | H04L 63/1425 |
| 10,216,485 B2* | 2/2019 | Misra | H04L 67/10 |
| 2005/0000165 A1* | 1/2005 | Dischinat | E06B 7/23 |
| | | | 49/496.1 |
| 2007/0226796 A1* | 9/2007 | Gilbert | G06F 21/577 |
| | | | 726/25 |
| 2013/0111592 A1* | 5/2013 | Zhu | G06F 21/577 |
| | | | 726/25 |
| 2013/0117852 A1* | 5/2013 | Stute | H04L 63/1425 |
| | | | 726/23 |
| 2014/0359552 A1* | 12/2014 | Misra | H04L 67/12 |
| | | | 717/100 |
| 2015/0020199 A1* | 1/2015 | Neil | H04L 63/1408 |
| | | | 726/23 |
| 2015/0215153 A1* | 7/2015 | Andrews | H04L 41/0836 |
| | | | 709/223 |
| 2016/0006629 A1* | 1/2016 | Lanakiev | G06F 21/85 |
| | | | 709/224 |
| 2016/0275123 A1* | 9/2016 | Lin | G06F 9/5083 |
| 2017/0111247 A1* | 4/2017 | Uchiyama | G06F 3/1229 |
| 2020/0156120 A1* | 5/2020 | Amano | A61J 1/03 |

* cited by examiner

| DATE AND TIME OF ACCESS | IP ADDRESS | DEVICE NAME | SECURITY SOFTWARE |
|---|---|---|---|
| 20210401 09:01 | 192.168.10.100 | NAS01 | – |
| ... | ... | ... | ... |
| 20210401 09:12 | 192.168.10.200 | MFP01 | – |
| ... | ... | ... | ... |
| 20210401 09:15 | 192.168.10.11 | PC01 | SS01.ver3 |
| 20210401 09:45 | 192.168.10.12 | PC02 | SS01.ver3 |
| 20210401 10:13 | 192.168.11.101 | PC101 | SS01.ver3 |
| ... | ... | ... | ... |
| 20210413 09:06 | 192.168.10.100 | NAS01 | – |
| ... | ... | ... | ... |
| 20210413 09:06 | 192.168.10.200 | MFP01 | – |
| ... | ... | ... | ... |
| 20210413 09:15 | 192.168.10.11 | PC01 | SS01.ver3 |
| 20210413 09:25 | 192.168.11.102 | PC102 | SS01.ver2 |
| 20210413 09:32 | 192.168.11.105 | PC105 | SS01.ver3 |
| ... | ... | ... | ... |
| 20210430 09:00 | 192.168.10.100 | NAS01 | – |
| ... | ... | ... | ... |
| 20210430 09:35 | 192.168.10.200 | MFP01 | – |
| ... | ... | ... | ... |
| 20210430 17:00 | 192.168.10.16 | PC06 | SS01.ver3 |
| 20210430 17:05 | 192.168.11.103 | PC103 | SS01.ver3 |
| 20210430 18:32 | 192.168.11.104 | PC104 | – |

↑ TENANT LIST   ↑ INDIVIDUAL REPORT DISPLAY   ≡

REPORT CREATION

AGGREGATION PERIOD: 2021-04

TENANT ID: TENANT1    [SELECT]  [PDF OUTPUT]

DEVICE MANAGEMENT SYSTEM, DEVICE MANAGEMENT METHOD, AND RECORDING MEDIUM HAVING DEVICE MANAGEMENT PROGRAM RECORDED THEREON

INCORPORATION BY REFERENCE

This application is based upon and claims the benefit of priority from the corresponding Japanese Patent Application No. 2021-074201 filed on Apr. 26, 2021, the entire contents of which are incorporated herein by reference.

BACKGROUND

The present disclosure relates to a device management system, a device management method, and a recording medium having a device management program recorded thereon.

Conventionally, there has been known a system which manages devices connected to a network. For example, there has been known a system which searches for the status of use of IP addresses within a management range, with respect to the IP addresses used on a network, saves a result of the search in a file, and also displays as a list the status of use of the IP addresses obtained by the search, with respect to the IP addresses within the management range, on a screen of a display device.

Incidentally, there are cases where a user (an employee) uses in an office of a company a personal computer (PC) to be managed, which is an asset owned by the company, or uses the PC outside the office, such as at home. In such a case, there arises a problem in which it becomes difficult for the company to manage the location, the usage status, and the like, of each PC.

SUMMARY

An object of the present disclosure is to provide a device management system, a device management method, and a recording medium having a device management program recorded thereon, whereby it is possible to easily manage the devices to be managed.

A device management system according to one aspect of the present disclosure pertains to a device management system which manages a plurality of management target devices connected to a network, in which the device management system includes: an acquisition processing portion which acquires log information indicating each of connection histories of the plurality of management target devices to the network; an extraction processing portion which extracts, on the basis of the log information acquired by the acquisition processing portion, a specific first management target device from the plurality of management target devices; and a grouping processing portion which registers, on the basis of the log information acquired by the acquisition processing portion, and first identification information of the first management target device extracted by the extraction processing portion, each of the plurality of management target devices in one of a plurality of groups.

A device management method according to another aspect of the present disclosure pertains to a device management method of managing a plurality of management target devices connected to a network, in which the device management method employs one or more processors to execute: an acquisition step of acquiring log information indicating each of connection histories of the plurality of management target devices to the network; an extraction step of extracting, on the basis of the log information acquired in the acquisition step, a specific first management target device from the plurality of management target devices; and a grouping step of registering, on the basis of the log information acquired in the acquisition step, and first identification information of the first management target device extracted in the extraction step, each of the plurality of management target devices in one of a plurality of groups.

A recording medium according to yet another aspect of the present disclosure pertains to a recording medium having recorded thereon a device management program to manage a plurality of management target devices connected to a network, in which the program causes one or more processors to execute: an acquisition step of acquiring log information indicating each of connection histories of the plurality of management target devices to the network; an extraction step of extracting, on the basis of the log information acquired in the acquisition step, a specific first management target device from the plurality of management target devices; and a grouping step of registering, on the basis of the log information acquired in the acquisition step, and first identification information of the first management target device extracted in the extraction step, each of the plurality of management target devices in one of a plurality of groups.

According to the present disclosure, provided are a device management system, a device management method, and a recording medium having a device management program recorded thereon, whereby it is possible to easily manage the devices to be managed.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a table illustrating an example of log information stored in a device management apparatus according to the embodiment of the present disclosure.

FIG. 4 is an illustration showing an example of a display screen of the device management apparatus according to the embodiment of the present disclosure.

DETAILED DESCRIPTION

Embodiments of the present disclosure will be described below with reference to the accompanying drawings. Note that the following embodiments are merely one example embodying the present disclosure, and are not of a nature to limit the technical scope of the present disclosure.

Device Management System 100

Figure 1:
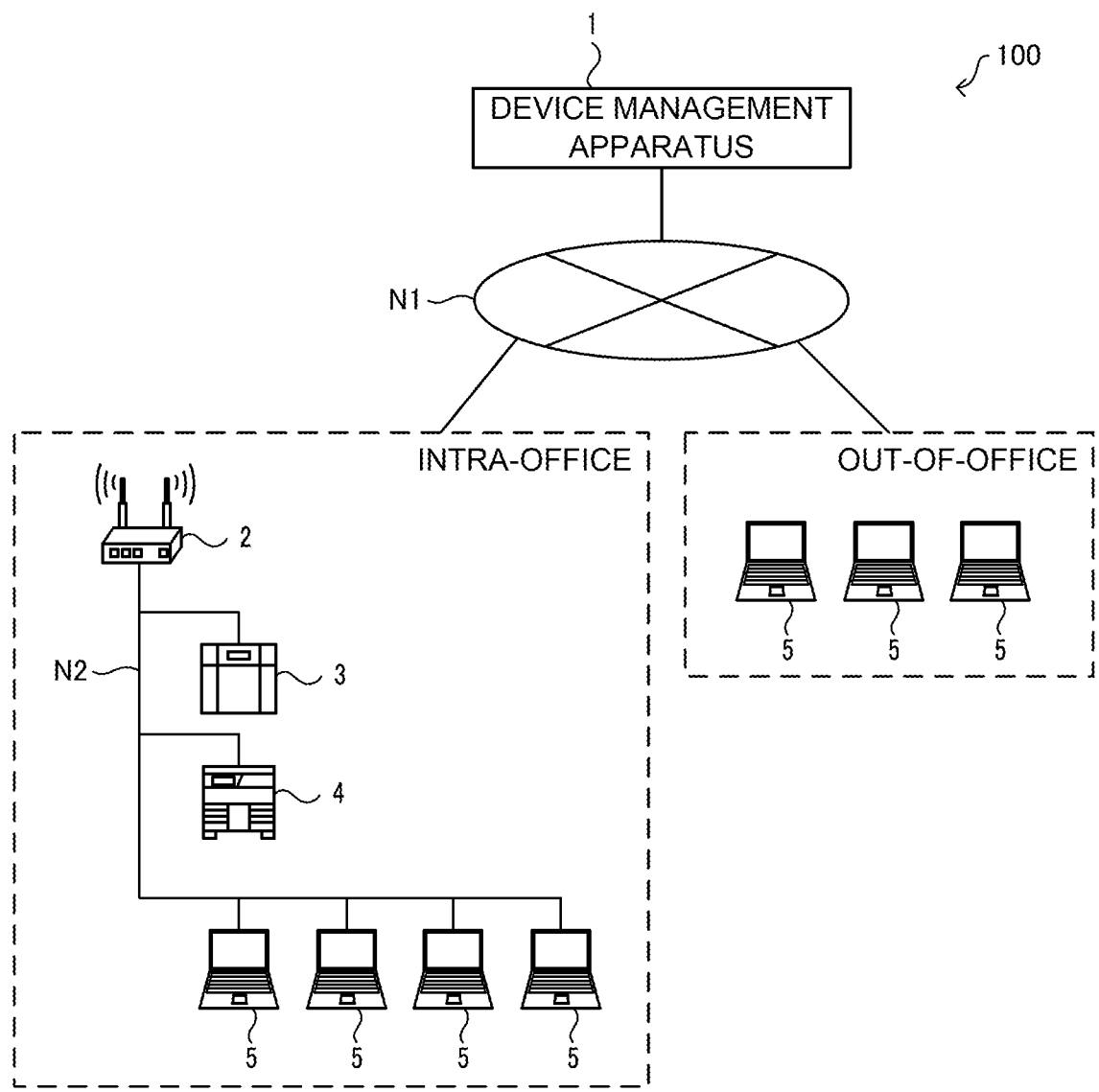
FIG. 1 is a schematic diagram illustrating a schematic configuration of a device management system according to an embodiment of the present disclosure.

FIG. 1 is a schematic diagram illustrating a schematic configuration of a device management system 100 according to an embodiment of the present disclosure. The device management system 100 includes a device management apparatus 1, a communication apparatus 2, a Network Attached Storage (NAS) 3, a Multifunction Printer (MFP) 4, and personal computers (PCs) 5. The device management system 100 is introduced in a specific company or the like. Further, the communication apparatus 2, the NAS 3, the MFP 4, and the PCs 5 are located in an office of the company, and the PCs 5 can be located outside the office of the company (for example, at home). The communication apparatus 2 in the office is a router which performs data communication with the device management apparatus 1 via a network N1 (the Internet, for example). The NAS 3, the MFP 4, and the PCs 5 in the office are connected to a network N2 (an intra-company LAN, for example), and each perform data communication with the device management apparatus 1 via the communication apparatus 2. The PCs 5 outside the office perform data communication with the device management apparatus 1 via the network N1 (the Internet, for example).

The device management apparatus 1 is, for example, constructed of one or more servers (cloud servers). The NAS 3 is a data server (a file server), and the MFP 4 is a multifunction peripheral. The NAS 3 and the MFP 4 are configured in such a way that the user (employee) in the office can use them by using his/her own PC 5. The PC 5 is allocated to each user. Each of the users can use the PC 5 allocated to himself/herself in the office or bring it outside the office for use.

The communication apparatus 2, the NAS 3, the MFP 4, and the PCs 5 are assets owned by the company, and are management target devices (devices to be managed). The device management apparatus 1 manages the location, a network connection status, etc., of each of the management target devices. In addition, the device management apparatus 1 provides usage status information including the location, the network connection status, etc., of each of the management target devices to a customer (a company, in this case). For example, a service provider who operates the service of providing the usage status information to the customer executes an application that is installed on the device management apparatus 1 or an operation terminal (not shown). For example, the service provider creates the usage status information (i.e., a network connection status report) of the management target devices during a predetermined period by means of the device management apparatus 1, and presents it to the customer. By acquisition of the usage status information, the customer can ascertain the usage status of each of the management target devices.

Device Management Apparatus 1

Figure 2:
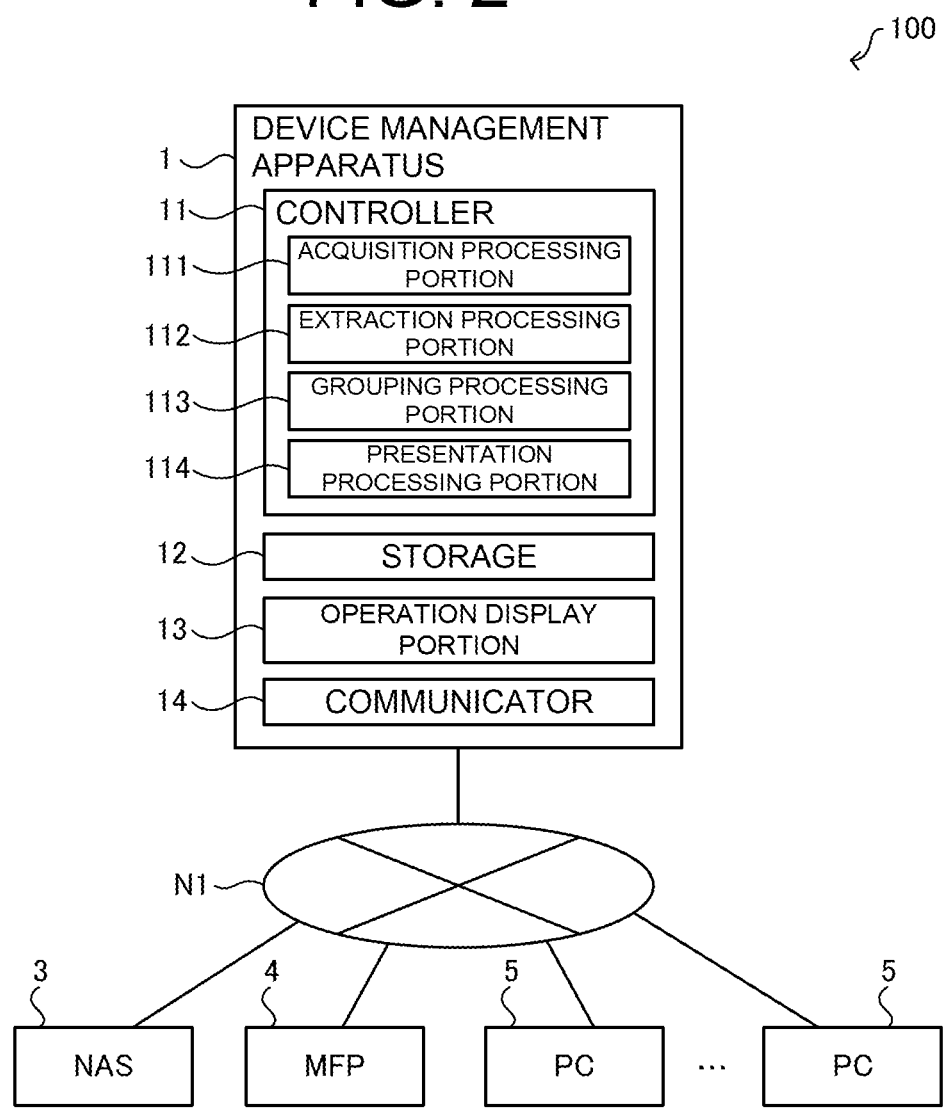
FIG. 2 is a functional block diagram illustrating a configuration of the device management system according to the embodiment of the present disclosure.

As illustrated in FIG. 2, the device management apparatus 1 is provided with a controller 11, a storage 12, an operation display portion 13, a communicator 14, and the like. The device management apparatus 1 corresponds to one or more cloud servers. Note that the device management apparatus 1 is not limited to a cloud server, and may correspond to one or more physical servers.

The communicator 14 is a communication interface for connecting the device management apparatus 1 to the network N1 in a wired or wireless manner, and executing data communication conforming to a predetermined communication protocol with the NAS 3, the MFP 4, and the PCs 5 via the network N1.

The operation display portion 13 is a user interface including: a display portion such as a liquid crystal display or an organic EL display that displays various kinds of information; and an operation portion such as a mouse, a keyboard, or a touch panel that receives operations.

The storage 12 is a non-volatile storage, such as a hard disk drive (HDD), a solid state drive (SSD), or a flash memory, which stores various kinds of information. In the storage 12, data such as log information D1 is stored. FIG. 3 shows an example of the log information D1. Note that FIG. 3 shows the log information D1 indicating connection histories of the respective management target devices to the network N1 (device management apparatus 1) during a predetermined period (from Apr. 1 to Apr. 30, 2021). The log information D1 includes information such as the date and time of access, an IP address, a device name, and security software. The date and time of access mentioned above refers to information indicating the date and time when the management target device accessed the network N1. The IP address mentioned above refers to the IP address (identification information) of the management target device. The device name mentioned above refers to the name (e.g., a device number) of the management target device. The security software mentioned above refers to information such as the name, version, and the like, of the security software installed on the management target device. Here, "NAS01" represents one name of the NAS 3, "MFP01" represents one name of the MFP 4, and "PC01" represents one name of the PC 5. In "SS01.ver3", "SS01" represents the name of the security software, and "ver3" represents the version of the security software.

Each time the controller 11 performs data communication with (i.e., accesses) each of the management target devices, the controller 11 acquires information such as the date and time of access, the IP address, the device name, and the security software, and stores the log information D1 in the storage 12. In the storage 12, pieces of the past log information D1 are accumulated.

In the storage 12, a device management program for causing the controller 11 to execute device management processing (FIG. 9) to be described later is stored. For example, the device management program is recorded on a computer-readable recording medium such as a CD or a DVD in a non-transitory way, is read by a reading device (not illustrated) such as a CD drive or a DVD drive provided in the device management apparatus 1, and is stored in the storage 12. Alternatively, the device management program may be distributed from other servers and stored in the storage 12.

The controller 11 includes control devices such as a CPU, a ROM, and a RAM. The CPU is a processor which executes various kinds of arithmetic processing. The ROM stores in advance control programs such as a BIOS and an OS for causing the CPU to execute various kinds of processing. The RAM stores various kinds of information, and is used as a temporary storage memory (work area) for the various kinds of processing that the CPU is to execute. Further, as the controller 11 executes various control programs stored in advance in the ROM or the storage 12 by the CPU, the controller 11 controls the device management apparatus 1.

Specifically, the controller 11 includes various processing portions such as an acquisition processing portion 111, an extraction processing portion 112, a grouping processing portion 113, and a presentation processing portion 114. The controller 11 functions as the various processing portions by executing the various kinds of processing according to the device management program. Also, a part of or all of the processing portions included in the controller 11 may be configured by an electronic circuit. The device management program may be a program for causing a plurality of processors to function as the various processing portions mentioned above.

The acquisition processing portion 111 acquires the log information D1 indicating each of the connection histories of a plurality of management target devices to the network N1 (device management apparatus 1).

For example, when the service provider creates the aforementioned usage status information for the management target devices at the customer (company), the service provider enters a target period (an aggregation period) and a customer ID (a tenant ID) on an operation screen P1 shown in FIG. 4, and then presses an output button. For example, the service provider enters, on May 1, 2021, "April 2021" as the target period on the operation screen P1 in order to create the usage status information of the last month (for April). By doing so, the acquisition processing portion 111 acquires the log information D1 (FIG. 3) of "April 2021", which is the target period, from the storage 12.

The extraction processing portion 112 extracts, on the basis of the log information D1 acquired by the acquisition processing portion 111, a specific management target device (hereinafter referred to as a "specific device") from the plurality of management target devices.

Specifically, the extraction processing portion 112 extracts, from the plurality of management target devices, the specific device registered in advance in an intra-office group (corresponding to a first group of the present disclosure), which is the category of the inside the office. The intra-office group is a group for management target devices connected to the network N2 (corresponding to a first network of the present disclosure). Here, since the NAS 3 and the MFP 4 are devices installed in the office and used in the office, they are registered in the intra-office group in advance. Therefore, in a case where there exists at least one of the NAS 3 and the MFP 4, which have been registered in advance in the intra-office group, in the plurality of management target devices, the extraction processing portion 112 extracts the NAS 3 or the MFP 4 as the specific device. For example, the extraction processing portion 112 extracts the NAS 3 as the specific device when there exists the NAS 3 registered in advance in the intra-office group in the plurality of management target devices, and extracts the MFP 4 as the specific device when there exists no NAS 3 registered in advance in the intra-office group but there exists the MFP 4 in the plurality of management target devices.

In addition, when there exists neither the NAS 3 nor the MFP 4 registered in advance in the intra-office group in the plurality of management target devices, the extraction processing portion 112 extracts a segment (most common segment) that is most common among the segments in the IP addresses of the respective PCs 5, and extracts the PC 5 to which the most common segment is allocated as the specific device. The NAS 3, the MFP 4, and the PC 5 that are extracted as the specific devices are each an example of a first management target device of the present disclosure.

Since the log information D1 exemplified in FIG. 3 includes access information of the NAS 3 and the MFP 4, the extraction processing portion 112 extracts the NAS 3 as the specific device.

The grouping processing portion 113 registers each of the plurality of management target devices in one of a plurality of groups, on the basis of the log information D1 acquired by the acquisition processing portion 111, and the identification information (corresponding to first identification information of the present disclosure) of the specific device extracted by the extraction processing portion 112. The plurality of groups include, for example, the intra-office group and an out-of-office group.

Specifically, the grouping processing portion 113 registers the management target device to which a segment, which is the same as the segment (representative segment) in the IP address of the specific device, is allocated in the intra-office group, and registers the management target device to which a segment, which is different from the segment (representative segment) in the IP address of the specific device, is allocated in the out-of-office group. The out-of-office group (corresponding to a second group of the present disclosure) is a group for management target devices connected to the network N1 (corresponding to a second network of the present disclosure). That is, the grouping processing portion 113 registers each of the plurality of management target devices in either the intra-office group that is connected to the network N2 or the out-of-office group that is connected to the network N1.

For example, according to the log information D1 shown in FIG. 3, the NAS 3 is extracted as the specific device. Therefore, the grouping processing portion 113 sets the segment "196.168.10" in the IP address "196.168.10.100" of the NAS 3 as the representative segment. Then, the grouping processing portion 113 extracts the management target devices to which a segment that is the same as the representative segment is allocated, and registers those management target devices in the intra-office group. Furthermore, the grouping processing portion 113 extracts the management target devices to which a segment that is different from the representative segment is allocated, and registers those management target devices in the out-of-office group.

For example, the grouping processing portion 113 extracts, from the log information D1 (FIG. 3), the devices named as PC01, PC02, PC06, etc., including the representative segment "196.168.10" in their IP addresses, and registers those devices in the intra-office group. Further, the grouping processing portion 113 extracts, from the log information D1 (FIG. 3), the devices named as PC101, PC102, PC103, PC104, PC105, etc., including the segment "196.168.11", which is different from the representative segment "196.168.10", in their IP addresses, and registers those devices in the out-of-office group.

Furthermore, in a case where the NAS 3 is not included in the log information D1, but the MFP 4 is included in the log information D1, for example, the segment "196.168.10" in the IP address "196.168.10.200" of the MFP 4 is set as the representative segment. Then, the grouping processing portion 113 extracts the management target devices to which a segment that is the same as the representative segment is allocated, and registers those management target devices in the intra-office group. Furthermore, the grouping processing portion 113 extracts the management target devices to which a segment that is different from the representative segment is allocated, and registers those management target devices in the out-of-office group.

Also, in a case where neither the NAS 3 nor the MFP 4 is included in the log information D1, and the PC 5 to which the most common segment is allocated is extracted as the specific device, for example, the grouping processing portion 113 sets the most common segment as the representative segment. Then, the grouping processing portion 113 extracts the PCs 5 to which a segment that is the same as the representative segment is allocated, and registers those PCs in the intra-office group. Furthermore, the grouping processing portion 113 extracts the PCs 5 to which a segment that is different from the representative segment is allocated, and registers those PCs in the out-of-office group.

Figure 5:
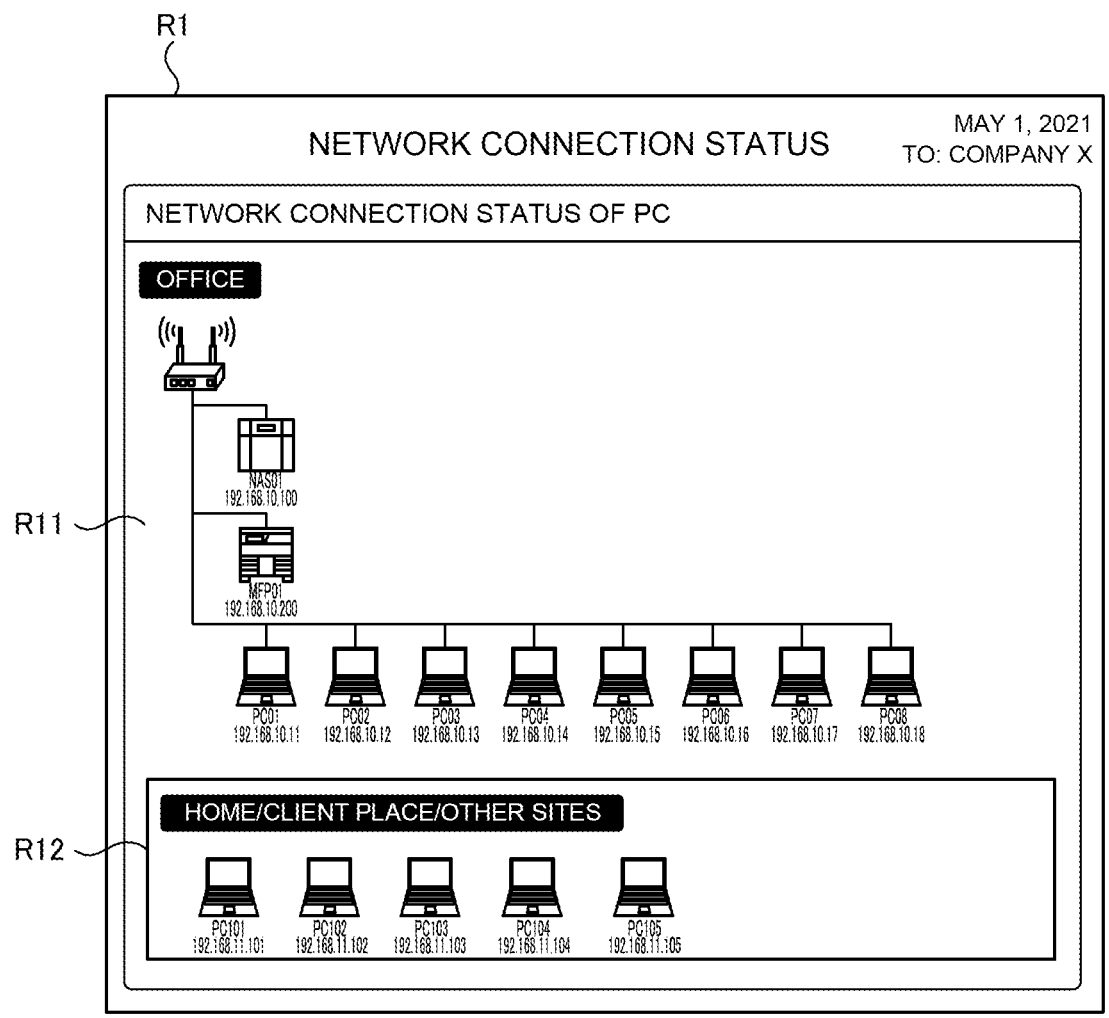
FIG. 5 is an illustration showing an example of a network connection status report presented by the device management apparatus according to the embodiment of the present disclosure.

The presentation processing portion 114 sorts each of the plurality of management target devices by the group and presents the sorted management target devices. Specifically, the presentation processing portion 114 creates the usage status information which displays the management target devices that have been registered in the intra-office group by the grouping processing portion 113, and the management target devices that have been registered in the out-of-office group by the grouping processing portion 113, in such a way that they are distinguished from each other. For example, in a network connection status report R1 shown in FIG. 5, the presentation processing portion 114 causes the devices named as NAS01, MFP01, and PC01 to PC08, which have been registered in the intra-office group, to be displayed in an intra-office group field R11, and causes the devices named as PC101 to PC105, which have been registered in the out-of-office group, to be displayed in an out-of-office group field R12.

Figure 6:
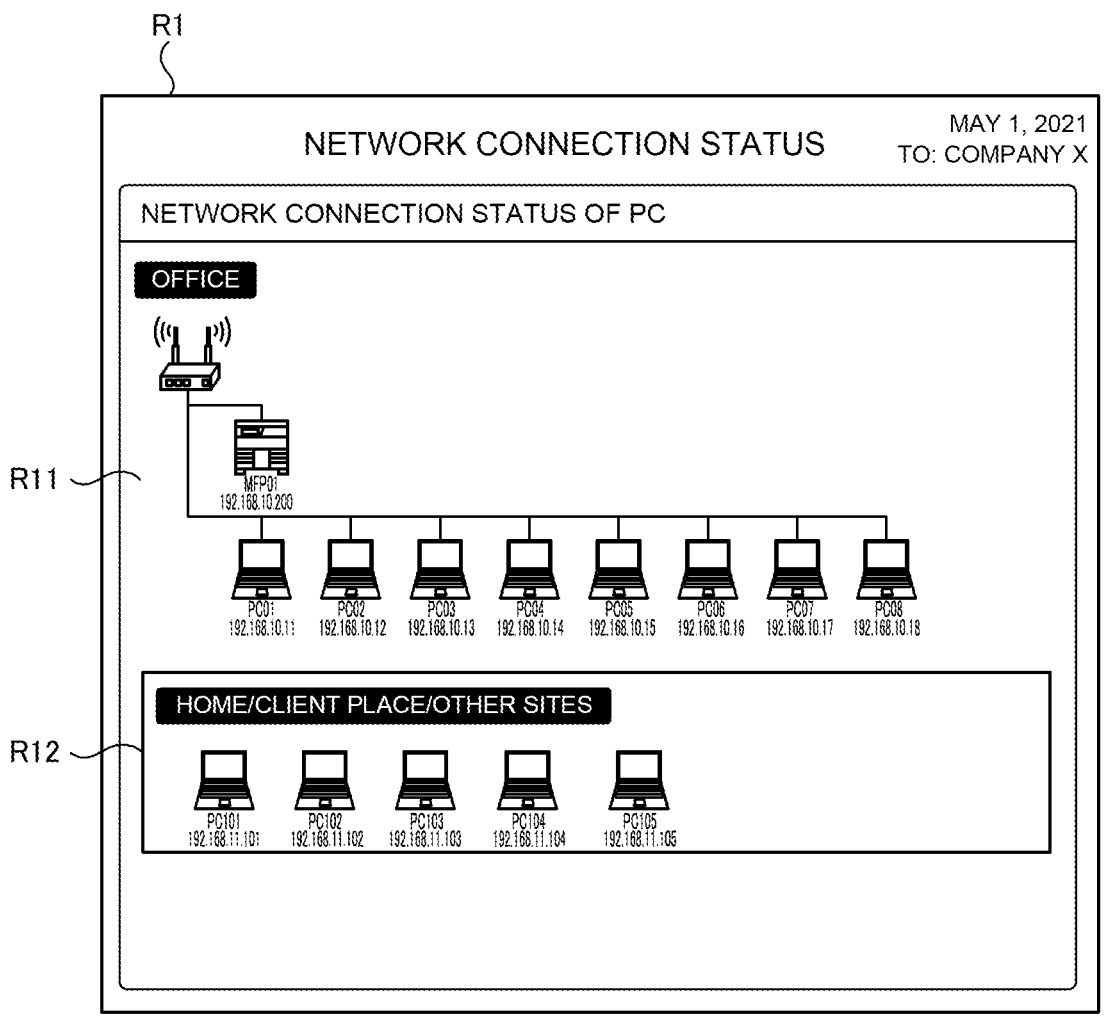
FIG. 6 is an illustration showing an example of a network connection status report presented by the device management apparatus according to the embodiment of the present disclosure.

Here, in a case where there exists no NAS 3 in the log information D1, but there exists the MFP 4 in the log information D1, the segment of the MFP 4 is set as the representative segment, and the PCs 5 including the representative segment are registered in the intra-office group. In this case, in the network connection status report R1 shown in FIG. 6, for example, the presentation processing portion 114 causes the devices named as MFP01 and PC01 to PC08, which have been registered in the intra-office group, to be displayed in the intra-office group field R11, and causes the devices named as PC101 to PC105, which have been registered in the out-of-office group, to be displayed in the out-of-office group field R12.

Figure 7:
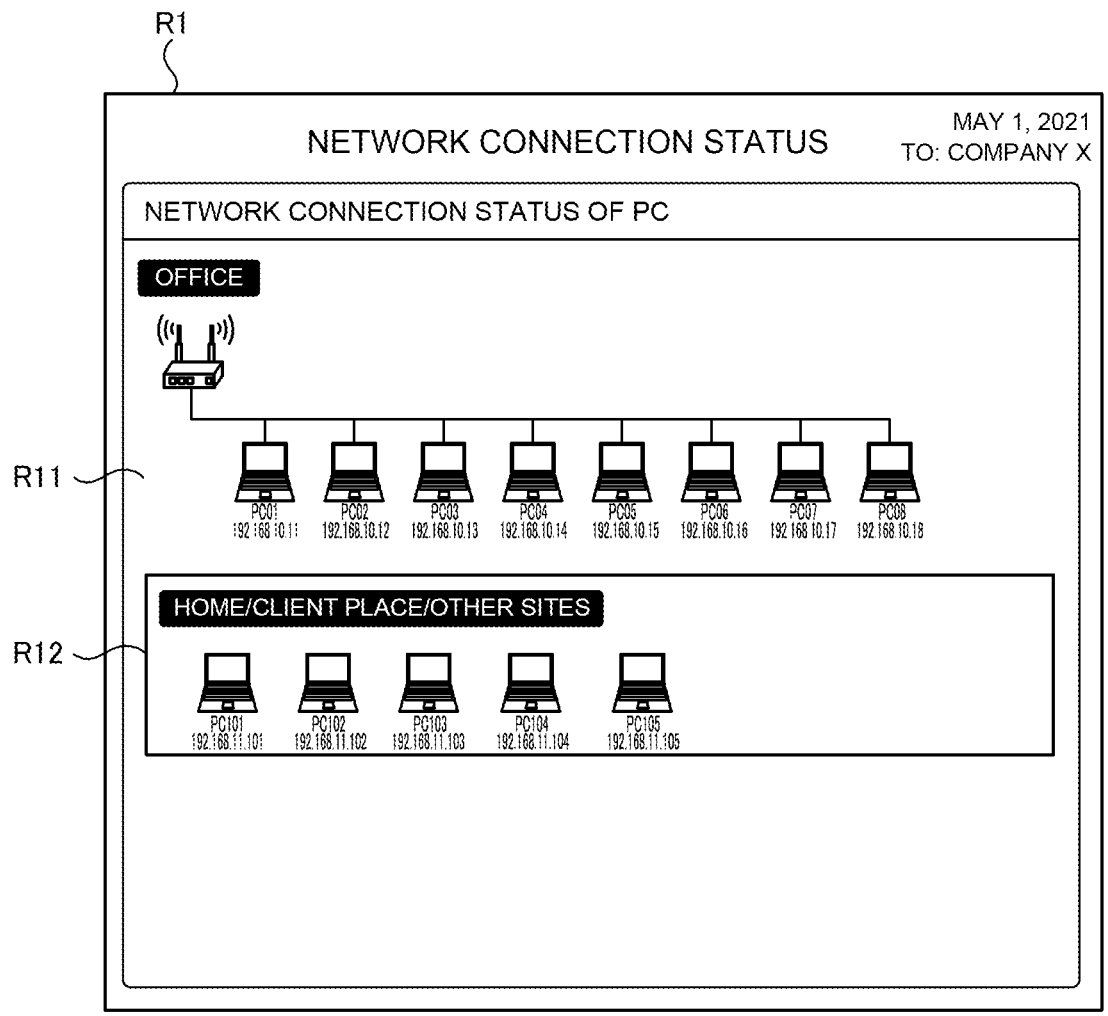
FIG. 7 is an illustration showing an example of a network connection status report presented by the device management apparatus according to the embodiment of the present disclosure.

Also, in a case where there exists neither the NAS 3 nor the MFP 4 in the log information D1, the most common segment is set as the representative segment, and the PCs 5 including the representative segment are registered in the intra-office group. In this case, in the network connection status report R1 shown in FIG. 7, for example, the presentation processing portion 114 causes the devices named as PC01 to PC08, which have been registered in the intra-office group, to be displayed in the intra-office group field R11, and causes the devices named as PC101 to PC105, which have been registered in the out-of-office group, to be displayed in the out-of-office group field R12.

The presentation processing portion 114 provides the network connection status report R1 to the customer (company) in data or written form.

Also, the presentation processing portion 114 determines the security level of each of the plurality of management target devices, on the basis of the log information D1 acquired by the acquisition processing portion 111, and presents warning information in association with the management target device whose security level is below a predetermined level. For example, when no security software is installed on the PC 5, the presentation processing portion 114 determines the security level of the PC 5 as being "Level 1", which is the lowest level. Further, when the PC 5 has security software installed but the version of the security software is old, for example, the presentation processing portion 114 determines the security level of the PC 5 as being "Level 2". Furthermore, when security software of the latest version is installed on the PC 5, for example, the presentation processing portion 114 determines the security level of the PC 5 as being "Level 3", which is the highest level.

Figure 8:
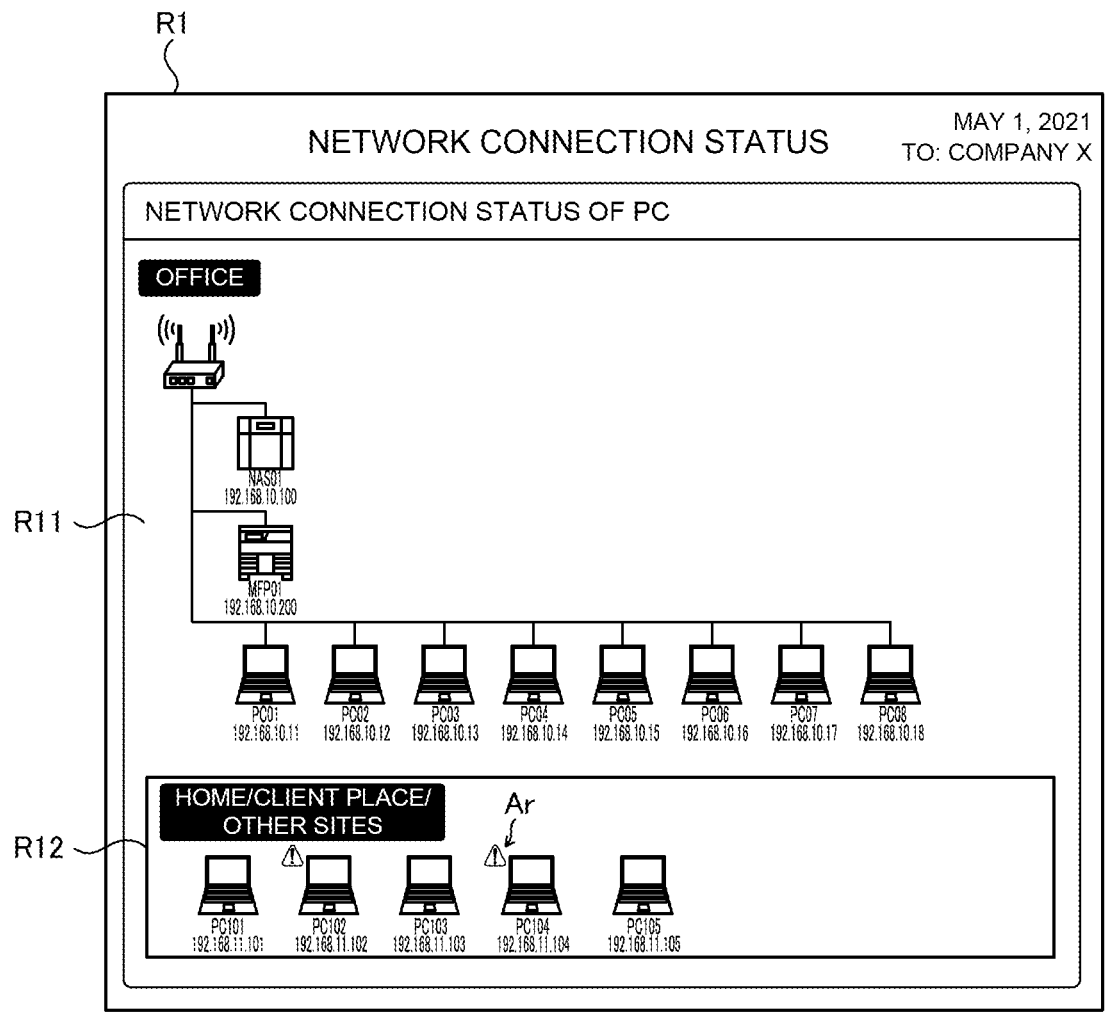
FIG. 8 is an illustration showing an example of a network connection status report presented by the device management apparatus according to the embodiment of the present disclosure.

In the log information D1, security information including whether security software is installed on the PC 5 or not, and the version information of the security software being installed is registered (see FIG. 3). The presentation processing portion 114 refers to the security information of the log information D1, and determines the security level of each of the PCs 5. Then, the presentation processing portion 114 displays warning information Ar in association with the PC 5 whose security level that has been determined is below a predetermined level (level 3, for instance). The log information D1 shown in FIG. 3 indicates that the version of security software SS01 installed on the device named as PC102 is "ver2", which is older than the latest version "ver3", and that no security software is installed on the device named as PC 104. In this case, as indicated in the network connection status report R1 of FIG. 8, the presentation processing portion 114 displays the warning information Ar in association with each of the devices named as PC104 whose security level is "Level 1", and PC102 whose security level is "Level 2". The presentation processing portion 114 may display the devices for which a warning should be given, i.e., PC102 and PC104, to be highlighted (lit, blinked, etc.).

In addition, when displaying the warning information Ar in association with the PC 5, for example, the presentation processing portion 114 may further display user information, such as the name of the user of the relevant PC 5, a group to which the user belongs, and an e-mail address of the user, in association with the relevant PC 5. By this feature, a manager of the management target devices can check the network connection status report R1 and contact the user of the PC 5 for which a warning should be given, for example.

Consequently, it is possible to notify the customer that security measures need to be taken for the devices named as PC102 and PC104.

Device Management Processing

Figure 9:
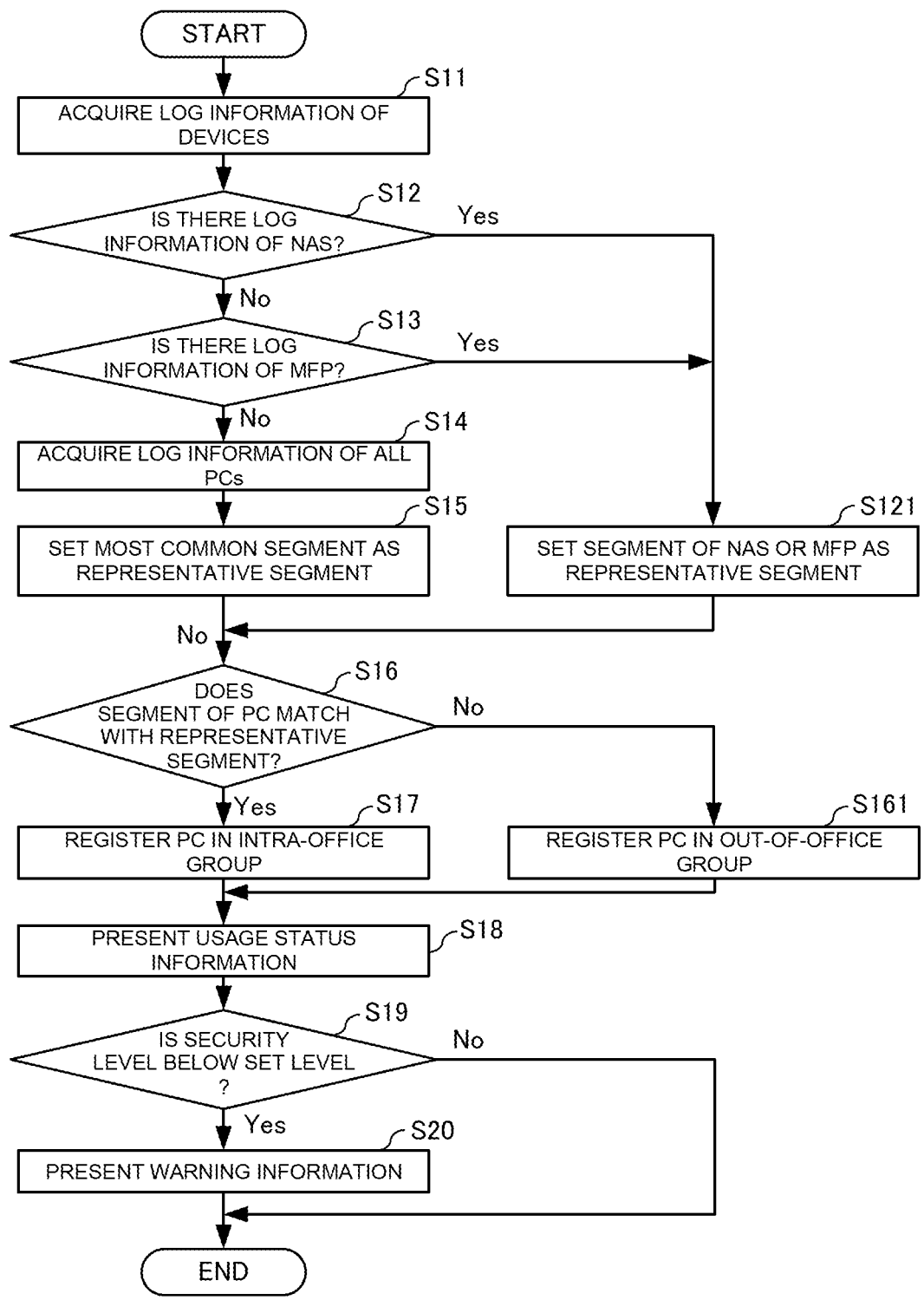
FIG. 9 is a flowchart illustrating an example of a procedure of device management processing executed by the device management system according to the embodiment of the present disclosure.

With reference to FIG. 9, an example of a procedure of device management processing executed in the device management system 100 will now be described.

Note that the present disclosure can be considered as a disclosure of a device management method of executing one or more steps included in the device management processing. Further, the one or more steps included in the device management processing described herein may be omitted as appropriate. Furthermore, the order of execution of the respective steps of the device management processing may be varied as long as the same or similar effect and advantage are produced. In the example described below, the controller 11 of the device management apparatus 1 executes each step of the device management processing. However, according to another embodiment, one or more processors may decentrally execute the respective steps of the device management processing.

For example, when the service provider enters the target period (aggregation period) and the customer ID (tenant ID) on the operation screen P1 (FIG. 4), and then presses the output button, the controller 11 starts the device management processing.

In step S11, the controller 11 acquires the log information D1 indicating each of the connection histories of a plurality of management target devices to the network N1 (device management apparatus 1). For example, when the service provider enters, on May 1, 2021, "April 2021" as the target period on the operation screen P1 in order to create the usage status information of the last month (for April), the controller 11 acquires the log information D1 (FIG. 3) of "April 2021", which is the target period, from the storage 12.

Next, in step S12, the controller 11 determines whether or not there exists log information (access information) of the NAS 3 in the acquired log information D1. If there exists log information of the NAS 3 in the log information D1 (S12: Yes), the processing proceeds to step S121. Meanwhile, if there exists no log information of the NAS 3 in the log information D1 (S12: No), the processing proceeds to step S13.

In step S13, the controller 11 determines whether or not there exists log information (access information) of the MFP 4 in the acquired log information D1. If there exists log information of the MFP 4 in the log information D1 (S13: Yes), the processing proceeds to step S121. Meanwhile, if there exists no log information of the MFP 4 in the log information D1 (S13: No), the processing proceeds to step S14.

If there exists log information of the NAS 3 in the log information D1 (S12: Yes), in step S121, the controller 11 extracts the NAS 3 as the specific device, and sets the segment "196.168.10" in the IP address "196.168.10.100" of the NAS 3 as the representative segment.

Further, if there exists no log information of the NAS 3 in the log information D1, but there exists log information of the MFP 4 in the log information D1 (S13; Yes), in step S121, the controller 11 extracts the MFP 4 as the specific device, and sets the segment "196.168.10" in the IP address "196.168.10.200" of the MFP 4 as the representative segment. After step S121, the processing proceeds to step S16.

In contrast, if there exists no log information of the NAS 3 or the MFP 4 in the log information D1 (S13: No), in step S14, the controller 11 acquires the log information of all of the PCs 5.

Next, in step S15, the controller 11 extracts a segment (most common segment) that is most common among the segments in the IP addresses of all of the PCs 5, and sets the most common segment as a representative segment. After step S15, the processing proceeds to step S16.

In step S16, the controller 11 determines whether the segment in the IP address of the PC 5 included in the log information D1 matches with the representative segment or not. If the segment in the IP address of the PC 5 matches with the representative segment (S16: Yes), the processing proceeds to step S17. Meanwhile, if the segment in the IP address of the PC 5 does not match with the representative segment (S16: No), the processing proceeds to step S161.

In step S17, the controller 11 registers the PC 5 in the intra-office group. Meanwhile, in step S161, the controller 11 registers the PC 5 in the out-of-office group. The controller 11 registers all of the PCs 5 included in the log information D1 by sorting them into either the intra-office group or the out-of-office group.

Here, in the log information D1, with respect to the same PC 5, the segment in the IP address may or may not match with the representative segment depending on the case. For example, given that the PC 5 was existent in the office on one day, the segment "196.168.10" corresponding to the inside of the office is allocated to the PC 5, and so the segment of the PC 5 matches with the representative segment. In contrast, given that the PC 5 was existent outside the office on another day, the segment "196.168.11" corresponding to the outside of the office is allocated to the PC 5, and so the segment of the PC 5 does not match with the representative segment. As can be seen, there may be a case where a plurality of pieces of access information of the same PC 5 are registered in the log information D1, and the segments in the respective pieces of the access information may be different from each other. In such a case, the controller 11 registers the PC 5 as mentioned above in each of the intra-office group and the out-of-office group.

Alternatively, in the above case, the controller 11 may register the PC 5 in either the intra-office group or the out-of-office group on the basis of the segment of the PC 5 of the latest date. For example, if the PC 5 was existent outside the office on the latest day, the controller 11 registers the PC 5 in the out-of-office group.

When the registration of each of the PCs 5 included in the log information D1 to the group is finished (S17 and S161), the controller 11 presents the usage status information in step S18. Specifically, the controller 11 creates the usage status information (network connection status report R1) which displays the management target devices that have been registered in the intra-office group, and the management target devices that have been registered in the out-of-office group, in such a way that they are distinguished from each other, and presents the created information (report) to the customer (see FIGS. 5 to 7).

Next, in step S19, the controller 11 determines whether the security level of the PC 5 is below a predetermined level or not. If the security level of the PC 5 is below the predetermined level (S19: Yes), the processing proceeds to step S20. Meanwhile, if the security level of the PC5 is not below the predetermined level (S19: No), the processing is ended. For example, when no security software is installed on the PC 5, or when the version information of the security software installed on the PC 5 does not represent the latest version, for example, the controller 11 determines that the security level of the PC 5 is below the predetermined level. The controller 11 refers to the security information registered in the log information D1 (FIG. 3) and executes the determination processing described above.

In step S20, the controller 11 presents the warning information. For example, as indicated in the network connection status report R1 of FIG. 8, the controller 11 displays the warning information Ar in association with each of the devices named as PC102 and the PC104 whose security level is below the predetermined level. After that, the processing is ended.

In this way, the controller 11 can present, to the customer, the usage status (network connection status) in which each of the management target devices is sorted into the intra-office group and the out-of-office group.

As described above, the device management system 100 according to the present embodiment is a system which manages a plurality of management target devices connected to the network N1 (device management apparatus 1). Also, the device management system 100 acquires the log information D1 indicating each of connection histories of a plurality of management target devices to the network N1, and extracts, on the basis of the acquired log information D1, a specific management target device (a specific device) from the plurality management target devices. Further, the device management system 100 registers each of the plurality of management target devices in one of the intra-office group and the out-of-office group, on the basis of the acquired log information D1 and the identification information (IP address, segment) of the specific device, which has been extracted. Furthermore, the device management system 100 presents the usage status indicating information on the management target devices which are sorted into each of the intra-office group and the out-of-office group. According to the above configuration, in a company, for example, the location, the usage status, and the like, of the PC 5 to be managed can be accurately ascertained. Therefore, it becomes possible to easily manage the management target devices.

The present disclosure is not limited to the above-described embodiment. The present disclosure may correspond to embodiments indicated below.

As another embodiment of the present disclosure, the grouping processing portion 113 may group the management target devices in consideration of the log information of a period before the target period in which the usage status is to be aggregated.

Specifically, in a case where a first segment of the first management target device is extracted on the basis of first log information of a first predetermined period, the grouping processing portion 113 registers a second management target device corresponding to identical devices included in the first log information and in second log information of a second predetermined period, which is before the first predetermined period, such that the second management target device is registered in the first group when the segment of the second management target device included in the first log information and the segment of the second management target device included in the second log information are the same as each other. Meanwhile, when the segment of the second management target device included in the first log information and the segment of the second management target device included in the second log information are different from each other, the grouping processing portion 113 registers the second management target device in the second group.

Figure 10:
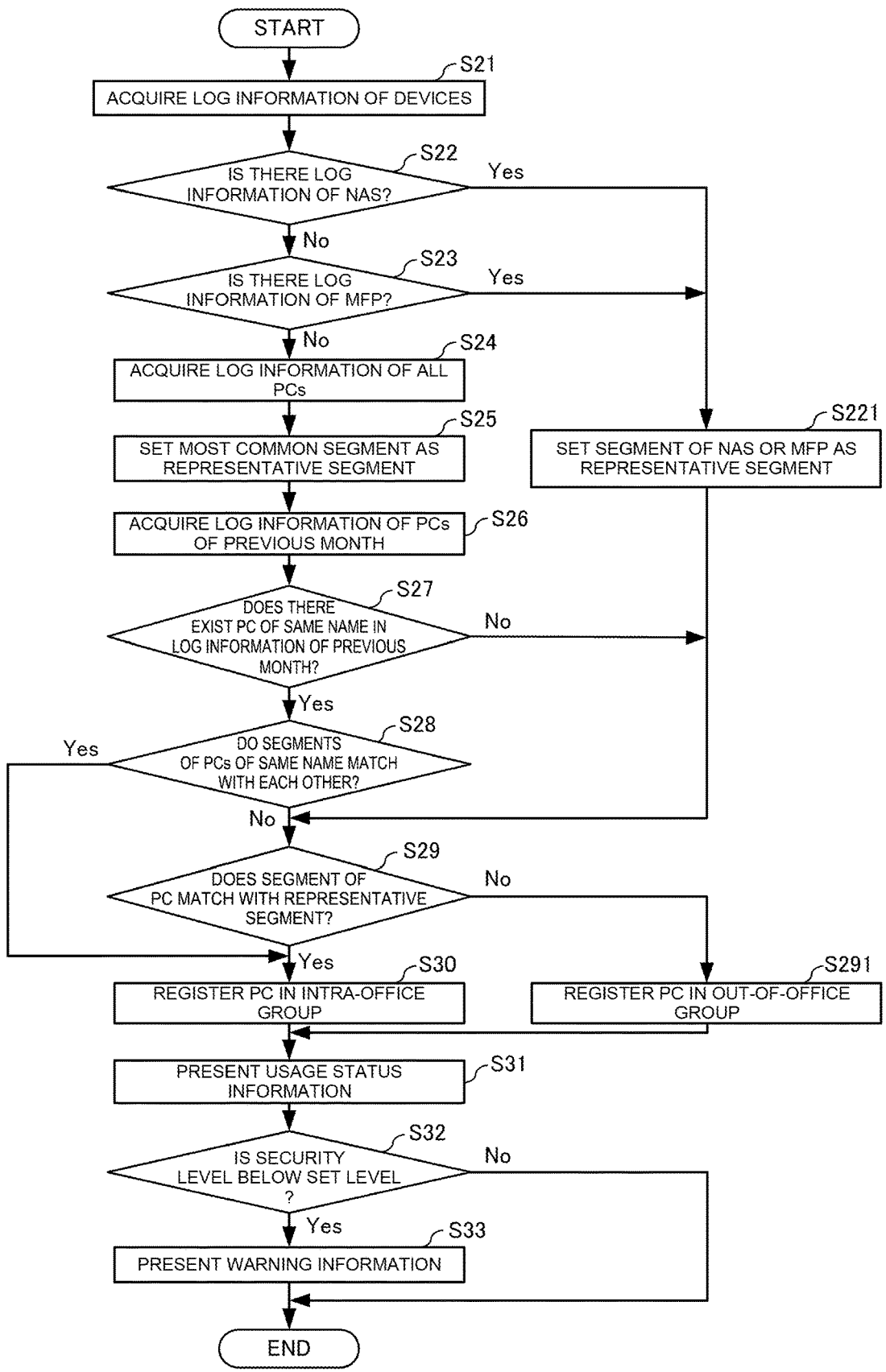
FIG. 10 is a flowchart illustrating an example of a procedure of device management processing executed by the device management system according to the embodiment of the present disclosure.

A specific example of the device management processing corresponding to the above configuration will be described below by referring to the flowchart shown in FIG. 10. In the flowchart shown in FIG. 10, since the processing in steps S21 to S25 and S221 are the same as the processing in steps S11 to S15 and S121 of the flowchart shown in FIG. 9, explanation of the same processing is omitted.

For example, with reference to the log information D1 (FIG. 3) of "April 2021", which is the target period, when there exists neither the NAS 3 nor the MFP 4, which are the devices registered in advance in the intra-office group, in the plurality of management target devices, the controller 11 sets a segment (most common segment) that is most common among the segments in the IP addresses of the respective PCs 5 as the representative segment (S25).

Next, in step S26, the controller 11 acquires the log information D1 of "March 2021", which is the immediately preceding period before the target period.

Next, in step S27, the controller 11 determines whether or not the log information D1 of the immediately preceding period includes the PC 5 having the same name as that of the PC 5 included in the log information D1 of the target period. If the log information D1 of the immediately preceding period includes the PC 5 having the same name as that of the PC 5 included in the log information D1 of the target period (S27: Yes), the processing proceeds to step S28. Meanwhile, if the log information D1 of the immediately preceding period does not include the PC 5 having the same name as that of the PC 5 included in the log information D1 of the target period (S27: No), the processing proceeds to step S29.

In step S28, the controller 11 determines whether the segments of the PCs 5 of the same name match with each other or not. If the segments of the PCs 5 of the same name match with each other (S28: Yes), the processing proceeds to step S30. Meanwhile, if the segments of the PCs 5 of the same name do not match with each other (S28: No), the processing proceeds to step S29.

In step S29, the controller 11 determines whether the segment in the IP address of the PC 5 included in the log information D1 of the target period matches with the representative segment or not. If the segment in the IP address of the PC 5 matches with the representative segment (S29: Yes), the processing proceeds to step S30. Meanwhile, if the segment in the IP address of the PC 5 does not match with the representative segment (S29: No), the processing proceeds to step S291.

In step S30, the controller 11 registers the PC 5 in the intra-office group. Meanwhile, in step S291, the controller 11 registers the PC 5 in the out-of-office group. The controller 11 registers all of the PCs 5 included in the log information D1 of the target period by sorting them into either the intra-office group or the out-of-office group.

Since the processing in steps S31 to S33 are the same as the processing in steps S18 to S20 of the flowchart shown in FIG. 9, explanation of the same processing is omitted.

According to the above configuration, for example, if the usage status (location) of the PC 5 in the target month has not been changed from the usage status (location) of the same in the previous month before the target month (S28: Yes), the PC 5 in question can be registered in the intra-office group (S30). Also, for example, even if the usage status (location) of the PC 5 in the target month has been changed from the usage status (location) of the same in the previous month before the target month (S28: No), if the segment of this PC matches with the representative segment (S29: Yes), the PC 5 in question can be registered in the intra-office group (S30).

In this way, the controller 11 may register the management target device in the applicable group on the basis of the log information D1 of different periods in the past.

As another embodiment of the present disclosure, the device management apparatus 1 may receive an operation on the operation screen P1 from a terminal of the customer (company). For example, the customer executes, in order to confirm the usage status of the management target devices of their own company, an application of the above-described service on a customer terminal, and enters the target period (aggregation period) and the customer ID (tenant ID), and then presses the output button. When the device management apparatus 1 receives an operation from the customer terminal, the device management apparatus 1 executes the processing described above, and generates the usage status (network connection status report R1) of the target period so that the usage status (report) is displayed on the customer terminal. The customer terminal displays the network connection status report R1. In this way, a customer who uses the service may be allowed to execute, at the customer terminal, the application according to the service.

The above-described embodiment employs a configuration in which the NAS 3 and the MFP 4 are registered in advance in the intra-office group. However, the present disclosure is not limited to this configuration. As another embodiment, the controller 11 of the device management apparatus 1 determines whether a specific device (the communication apparatus 2, the NAS 3, the MFP 4, etc.) is included or not, on the basis of attribute information (IP address, device number, device name, etc.) of the devices included in the log information of the management target devices, and when the specific device is included, the controller 11 registers the specific device in the intra-office group.

The specific management target device (the specific device) of the present disclosure is not limited to the NAS 3 or the MFP 4, but the communication apparatus 2 (a router) may also apply. When the communication apparatus 2 is registered in the intra-office group as the specific device, the controller 11 registers the management target device connected to the communication apparatus 2 in the intra-office group, and registers the management target device not connected to the communication apparatus 2 in the out-of-office group. When a plurality of communication apparatuses 2 are installed in an office of a company, the controller 11 registers a plurality of management target devices connected to the plurality of communication apparatuses 2 in the intra-office group collectively, and registers the management target device not connected to any of the communication apparatuses 2 in the out-of-office group.

In the above-described embodiment, the device management system 100 corresponds to the device management system according to the present disclosure, but the device management system according to the present disclosure is not limited thereto. For example, the device management system according to the present disclosure may be configured from the device management apparatus 1 alone.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims

The invention claimed is:

1. A device management system which manages a plurality of management target devices connected to a network, the device management system comprising:
    an acquisition circuit which acquires log information indicating each of connection histories of each of the plurality of management target devices to the network;
    an extraction circuit which extracts, based on the log information, a first management target device from the plurality of management target devices; and
    a grouping circuit which registers, based on the log information and first identification information of the first management target device, each of the plurality of management target devices in one of a plurality of groups,
    wherein when a management target device that is registered in advance in a first group exists in the plurality management target devices, the extraction circuit extracts the management target device that is registered in advance in the first group, as the first management target device,
    when the management target device that is registered in advance in the first group is non-existent in the plurality of management target devices, the extraction circuit extracts a first segment that is most common among respective segments in IP addresses of the plurality of management target devices, and extracts a management target device, from the plurality of management target devices, to which the first segment is allocated, as the first management target device,
    when the first segment of the first management target device is extracted based on first log information of a first predetermined period, the grouping circuit further registers a second management target device corresponding to identical devices that are included in the first log information and that are included in second log information of a second predetermined period, which is a period before the first predetermined period, such that
    the second management target device is registered in the first group when a segment of the second management target device included in the first log information and a segment of the second management target device included in the second log information are the same as each other,
    the second management target device is registered in a second group when the segment of the second management target device included in the first log information and the segment of the second management target device included in the second log information are different from each other.

2. The device management system according to claim 1, wherein the grouping circuit further registers, in the first group, a management target device to which a segment, which is a same segment as the segment in an IP address of the first management target device, is allocated, and registers, in the second group, a management target device to which a segment, which is a segment different from the segment in the IP address of the first management target device, is allocated.

3. The device management system according to claim 1, further comprising a presentation circuit, which sorts each of the plurality of management target devices by a group and presents the sorted plurality of management target devices.

4. The device management system according to claim 3, wherein the presentation circuit further determines a security level of each of the plurality of management target devices based on the log information acquired by the acquisition circuit, and presents warning information in association with a management target device having a security level below a predetermined level.

5. The device management system according to claim 1, wherein the grouping circuit further registers each of the plurality of management target devices in one of the first group connected to a first network and the second group connected to a second network.

6. A device management method of managing a plurality of management target devices connected to a network, the device management method comprising:
    acquiring, by one or more processors, log information indicating each of connection histories of each of the plurality of management target devices to the network;

extracting, by one or more processors, based on the log information, a first management target device from the plurality of management target devices; and registering, by one or more processors, based on the log information and first identification information of the first management target device, each of the plurality of management target devices in one of a plurality of groups, wherein when a management target device that is registered in advance in a first group exists in the plurality management target devices, the extraction circuit extracts the management target device that is registered in advance in the first group, as the first management target device, when the management target device that is registered in advance in the first group is non-existent in the plurality of management target devices, the method further comprises:

extracting a first segment that is most common among respective segments in IP addresses of the plurality of management target devices; and extracting a management target device, from the plurality of management target devices, to which the first segment is allocated, as the first management target device, and when the first segment of the first management target device is extracted based on first log information of a first predetermined period, the method further comprises registering a second management target device corresponding to identical devices that are included in the first log information and that are included in second log information of a second predetermined period, which is a period before the first predetermined period, such that the second management target device is registered in the first group when a segment of the second management target device included in the first log information and a segment of the second management target device included in the second log information are the same as each other, the second management target device is registered in a second group when the segment of the second management target device included in the first log information and the segment of the second management target device included in the second log information are different from each other.

7. A non-transitory computer-readable recording medium having recorded thereon a device management program to manage a plurality of management target devices connected to a network, the device management program comprising one or more instructions that, when executed by one or more processors, cause the one or more processors to:

acquire log information indicating each of connection histories of each of the plurality of management target devices to the network;

extract, based on the log information, a first management target device from the plurality of management target devices; and register, based on the log information and first identification information of the first management target device, each of the plurality of management target devices in one of a plurality of groups, wherein when a management target device that is registered in advance in a first group exists in the plurality management target devices, the extraction circuit extracts the management target device that is registered in advance in the first group, as the first management target device, when the management target device that is registered in advance in the first group is non-existent in the plurality of management target devices, the one or more processors are further caused to:

extract a first segment that is most common among respective segments in IP addresses of the plurality of management target devices; and extract a management target device, from the plurality of management target devices, to which the first segment is allocated, as the first management target device, and when the first segment of the first management target device is extracted based on first log information of a first predetermined period, the one or more processors are further caused to register a second management target device corresponding to identical devices that are included in the first log information and that are included in second log information of a second predetermined period, which is a period before the first predetermined period, such that the second management target device is registered in the first group when a segment of the second management target device included in the first log information and a segment of the second management target device included in the second log information are the same as each other, the second management target device is registered in a second group when the segment of the second management target device included in the first log information and the segment of the second management target device included in the second log information are different from each other.

* * * * *